(12) United States Patent
Meyer et al.

(10) Patent No.: US 12,380,321 B1
(45) Date of Patent: Aug. 5, 2025

(54) FLEXIBLE ARRAY DATA LOADING

(71) Applicant: Amazon Technologies, Inc., Seattle, WA (US)

(72) Inventors: Paul Gilbert Meyer, Jericho, VT (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1036 days.

(21) Appl. No.: 16/712,836

(22) Filed: Dec. 12, 2019

(51) Int. Cl.
*G06N 3/063* (2023.01)
*G06F 9/38* (2018.01)
*G06N 3/04* (2023.01)

(52) U.S. Cl.
CPC ........... *G06N 3/063* (2013.01); *G06F 9/3893* (2013.01); *G06N 3/04* (2013.01)

(58) Field of Classification Search
CPC ......... G06N 3/063; G06N 3/04; G06F 9/3893
See application file for complete search history.

(56) References Cited

U.S. PATENT DOCUMENTS

| | | | |
|---|---|---|---|
| 5,216,751 A * | 6/1993 | Gardner | G06N 3/063 706/42 |
| 11,003,985 B2 | 5/2021 | Kim et al. | |
| 11,126,690 B2 | 9/2021 | Azizi | |
| 11,194,549 B2 | 12/2021 | Liu et al. | |
| 11,379,556 B2 | 7/2022 | Mattina et al. | |
| 11,500,962 B1 | 11/2022 | Meyer et al. | |
| 11,625,453 B1 | 4/2023 | Meyer et al. | |
| 11,803,736 B1 | 10/2023 | Meyer et al. | |
| 2018/0336165 A1 | 11/2018 | Phelps et al. | |
| 2019/0114538 A1* | 4/2019 | Ng | G06N 3/08 |
| 2019/0156201 A1 | 5/2019 | Bichler et al. | |
| 2019/0236049 A1 | 8/2019 | Vantrease et al. | |
| 2019/0244086 A1* | 8/2019 | Franca-Neto | G06N 3/08 |
| 2019/0244106 A1 | 8/2019 | Franca-Neto | |
| 2019/0311243 A1 | 10/2019 | Whatmough et al. | |
| 2019/0362235 A1 | 11/2019 | Xu et al. | |
| 2020/0104669 A1* | 4/2020 | Chole | G06N 3/084 |
| 2020/0150598 A1* | 5/2020 | Kim | G06N 3/047 |
| 2020/0226201 A1* | 7/2020 | Ma | G06N 3/063 |

OTHER PUBLICATIONS

Lu et al. ("Flexflow: A flexible dataflow accelerator architecture for convolutional neural networks." 2017 (Year: 2017).*
U.S. Notice of Allowance dated Dec. 1, 2022 in U.S. Appl. No. 16/712,699.

(Continued)

*Primary Examiner* — Michelle T Bechtold
*Assistant Examiner* — Moriam Mosunmola Godo
(74) *Attorney, Agent, or Firm* — Weaver Austin Villeneuve & Sampson LLP

(57) ABSTRACT

To improve utilization of a systolic array, each row of the array is provided with two or more general purpose row input buses. Each of the general purpose row input data buses can be operable to transfer either feature map (FMAP) input elements or weight values into the processing elements of the corresponding row of the array. The flexibility of the general purpose row input buses allows weights to be loaded in parallel into the array to speed up weight loading times to reduce the overall latency.

20 Claims, 11 Drawing Sheets

(56) References Cited

OTHER PUBLICATIONS

U.S. Appl. No. 16/712,699, filed Dec. 12, 2019, Titled: Using Shared Data Bus to Support Systolic Array Tiling.
U.S. Appl. No. 18/192,092, inventors Meyer et al., filed Mar. 29, 2023.
U.S. Appl. No. 18/052,527, inventors Meyer et al., filed Nov. 3, 2022.
U.S. Appl. No. 18/474,129, inventors Meyer et al., filed Sep. 25, 2023.

* cited by examiner

US 12,380,321 B1

FLEXIBLE ARRAY DATA LOADING

BACKGROUND

The architecture of a neural network can include multiple operations. The operations can form different layers, including an input layer, an output layer, and a number of intermediate layers, often referred to as hidden layers. Each layer executes computations on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a Central Processing Unit (CPU) to perform the computations. CPUs, however, tend to be optimized for sequential rather than parallel computations, and thus can suffer from poor response times. Graphics Processing Units (GPUS) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network.

BRIEF DESCRIPTION OF THE DRAWINGS

Various embodiments in accordance with the present disclosure will be described with reference to the drawings, in which.

DETAILED DESCRIPTION

Figure 1:
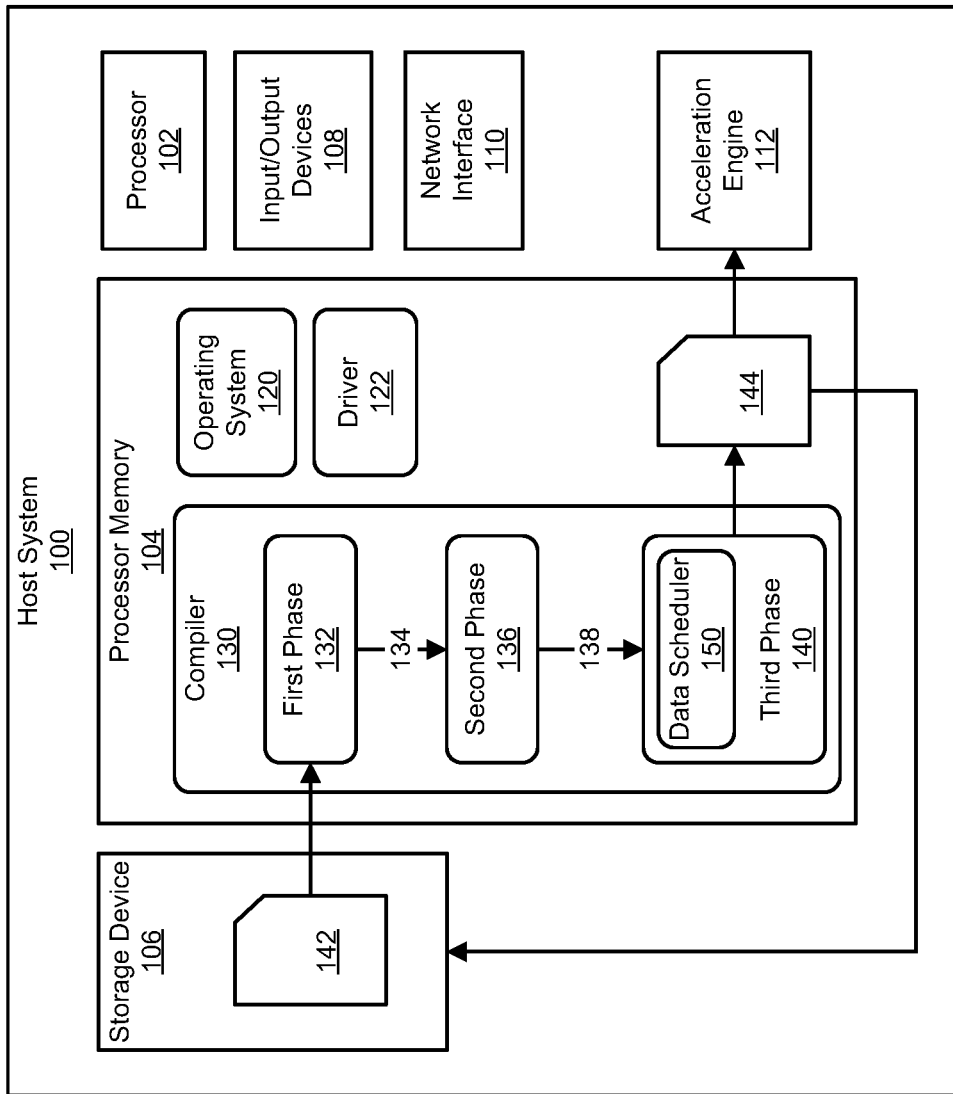
FIG. 1 is a block diagram illustrating an example of a system that includes a compiler.

Although "off-the-shelf" processors can often be used to execute neural networks, special-purpose integrated circuit devices can be designed to execute neural networks at a significantly higher efficiency than these processors. Such devices (which may be referred to as neural network processors) can have unique hardware features that allow the most-encountered operations of a neural network to be performed seamlessly, often in parallel with other operations of the neural network. For example, a neural network processor may include dedicated circuitry to perform matrix multiplication operations, which are often used in neural networks. Such dedicated circuitry can be implemented using an array of processing elements (which may be referred to as a systolic array), where each processing element (PE) contains circuitry to perform multiplication and accumulation operations to implement a matrix multiplication computation.

In a systolic array, two types of information may flow into each row of the array: feature map (FMAP) input elements and weight values. The weight values may flow into the array before the actual matrix multiply computation, and are stored in the processing elements (PEs) of the array. The FMAP input elements may flow in during the matrix multiply computation, and are multiplied in each PE by the previously stored weight value for that PE. The multiplication results are accumulated for each column of the array. The weight values for the next matrix multiplication can be loaded in the background while the current computation is occurring with the previously loaded weights. A dedicated FMAP input data bus can be used for FMAP loading, and a dedicated weight input data bus can be used for weight loading. Each FMAP input element and each weight value are shifted across the array at each clock cycle. Thus, for example, to load an array with a row-size of 128 PEs, 128 cycles may be needed to shift the proper values into each PE. The time required to shift in the FMAP input elements for a matrix multiplication depends on the FMAP dimensions and the batch size. It can vary from one cycle (e.g., for a multilayer perceptron model (MLP) with a batch size of 1) to many more cycles for a large convolution neural network or a large batch MLP.

While a systolic array can provide much faster performance than "off-the-shelf" processors when performing matrix multiplication computations, there can be instances where the systolic array may not be operating at full utilization. For example, if the FMAP dimension is small and the matrix multiplication completes more quickly than the weight loading time, the next matrix multiplication may not be launched directly after the current one, as the weight values for the next matrix multiplication have not yet finished loading into the array. As a result, the computations may stall and the array will be underutilized while waiting for the weight values to finish loading.

As a worst case example, with a MLP having a batch size of 1 is being executed, the FMAP depth is 1 element per row. For an array with 128 PEs per row, the weight load may take 128 cycles, and the next computation may not be started until the full weight load completes. In this scenario, the weight load bus will be fully saturated at all times, and the FMAP bus will send a single value every 128 cycles. Thus, the weight load bus may be idle for 127 cycles waiting for the weight load to complete, and the array may be operating at only $\frac{1}{128}$ of the maximum possible efficiency.

To improve the utilization of a systolic array, instead of using a dedicated FMAP input bus and a dedicated weight load input bus, the row input data buses can be implemented as general purpose input data buses that can switch from transferring FMAP input elements to transferring weight values, and vice versa. By providing the flexibility to transfer either FMAP input elements or weight values on any row input data bus, the weight values can be loaded into the array in parallel across all row input data buses when the buses are not transferring FMAP input elements. Thus, when executing computations with small FMAP dimensions, the otherwise idle time on the FMAP input bus can be used to speed up background weight loading times. In some implementations, the number of general purpose row input data buses can also be increased to further reduce the background weight loading times.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 on which a compiler 130, such as is described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that may be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code or instructions for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of local storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various steps before producing the instructions that are to be executed by the acceleration engine 112. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 140 can include a data scheduler 150 that determines how and when input data are loaded into the accelerator engine 112.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
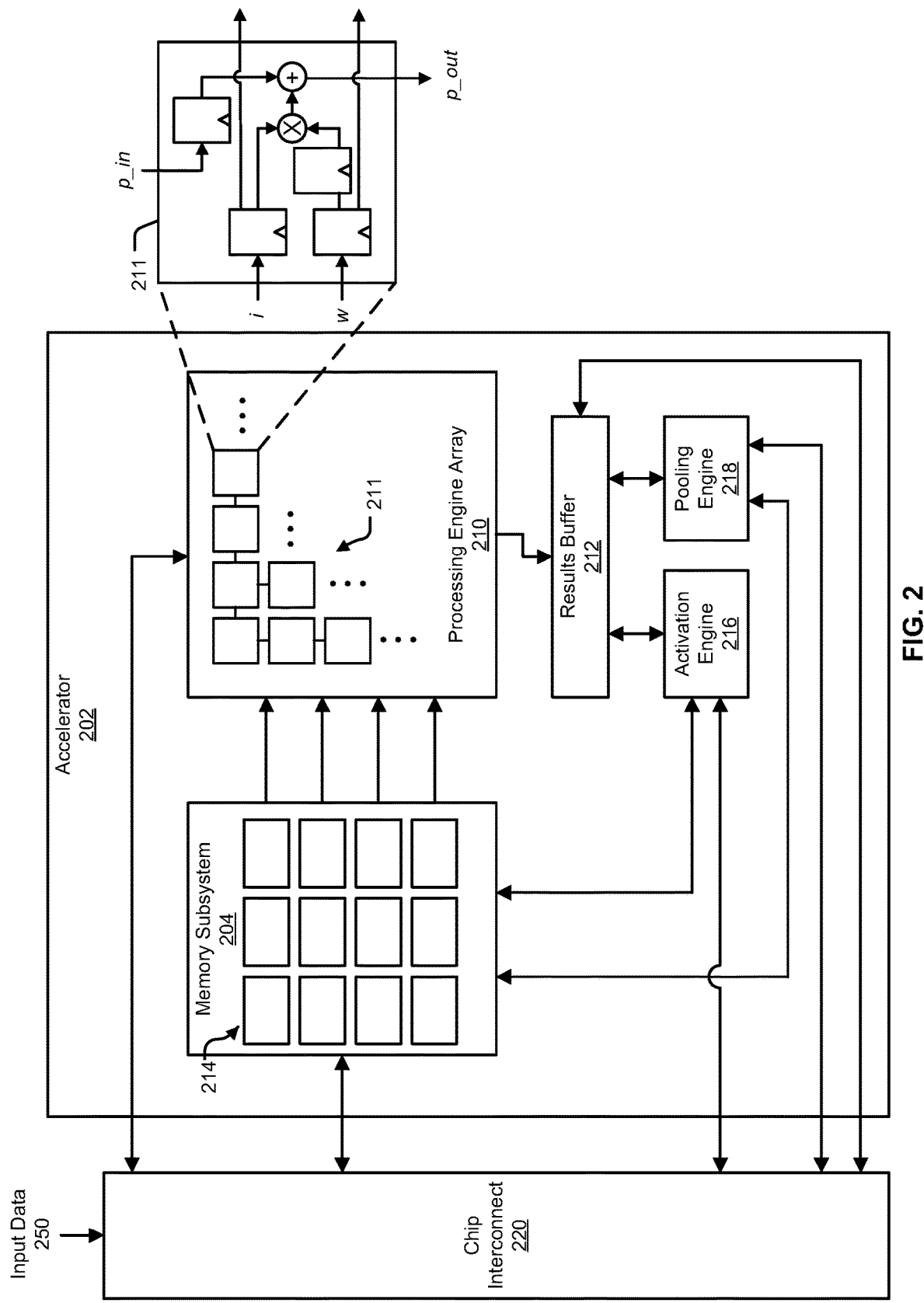
FIG. 2 is a block diagram illustrating an example of an integrated circuit device.

FIG. 2 is a block diagram illustrating an example of an integrated circuit device that can include a systolic array. The example of FIG. 2 illustrates an accelerator 202. In various examples, the accelerator 202, for a set of input data (e.g., input data 250), can execute computations using a processing engine array 210 (e.g., a systolic array), an activation engine 216, and/or a pooling engine 218. In some examples, the example accelerator 202 may be an integrated circuit component of a processor, such as a neural network processor. The processor may have other integrated circuit components, including additional accelerator engines.

In various implementations, the memory subsystem 204 can include multiple memory banks 214. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, values can be simultaneously read and provided to each row of the processing engine array 210, so that the entire processing engine array 210 can be in use in one clock cycle. As another example, the memory banks 214 can be read at the same time that results computed by the processing engine array 210 are written to the memory subsystem 204. In contrast, a single memory may be able to service only one read or write at a time. With a single memory, multiple clock cycles can be required, for example, to read input data for each row of the processing engine array 210 before the processing engine array 210 can be started.

In various implementations, the memory subsystem 204 can be configured to simultaneously service multiple clients, including the processing engine array 210, the activation engine 216, the pooling engine 218, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In some cases, each column of the processing engine array 210 can output a result, such that each column can count as a separate write client. In some cases, output from the processing engine array 210 can be written into the memory banks 214 that can then subsequently provide input data for the processing engine array 210. As another example, the activation engine 216 and the pooling engine 218 can include multiple execution channels, each of which can be separate memory clients. The memory banks 214 can be implemented, for example, using static random access memory (SRAM).

In various implementations, the memory subsystem 204 can include control logic. The control logic can, for example, keep track of the address spaces of each of the memory banks 214, identify memory banks 214 to read from or write to, and/or move data between the memory banks 214. In some implementations, memory banks 214 can be hardwired to particular clients. For example, a set of memory banks 214 can be hardwired to provide values to the rows of the processing engine array 210, with one memory bank servicing each row. As another example, a set of memory banks can be hard wired to receive values from columns of the processing engine array 210, with one memory bank receiving data for each column.

The processing engine array 210 is the computation matrix of the example accelerator 202. The processing engine array 210 can, for example, execute parallel integration, convolution, correlation, and/or matrix multiplication, among other things. The processing engine array 210 includes multiple processing elements 211, arranged in rows and columns, such that results output by one processing element 211 can be input directly into another processing element 211. A processing element 211 may also be referred to as a cell of the array. Processing elements 211 that are not on the outside edges of the processing engine array 210 thus can receive data to operate on from other processing elements 211, rather than from the memory subsystem 204.

In various examples, the processing engine array 210 uses systolic execution, in which data arrives at each processing element 211 from different directions at regular intervals. In some examples, input data can flow into the processing engine array 210 from the left and weight values can be loaded at the top. In some examples weights and input data (e.g., FMAP input elements) can flow from the left, and partial sums for accumulation can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 128 columns and 128 rows, or some other number of columns and rows.

An example of a processing element 211 is illustrated in FIG. 2 in an inset diagram. As illustrated by this example, a processing element 211 can include a multiplier-accumulator circuitry. Inputs from the left can include, for example, input data i and a weight value w, where the input data can be a feature map (FMAP) value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 211.

In the illustrated example, an input from above can include a partial sum, p in, provided either from another processing element 211 or from a previous round of computation by the processing engine array 210. When starting a computation for a new set of input data, the top row of the processing engine array 210 can receive a fixed value for p in, such as zero. As illustrated by this example, i and w are multiplied together and the result is summed with p in to produce a new partial sum, p out, which can be input into another processing element 211. Various other implementations of the processing element 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214 can be read from the memory subsystem 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the memory subsystem 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include for example, computing a maximum value, a minimum value, an average value, a median value, a summation, a multiplication, or another logical or mathematical combination. In various examples, the pooling engine 218 can include multiple execution channels that can operating on values from corresponding columns of the processing engine array 210. In these examples, the pooling engine 218 may be able to perform between 1 and n parallel computations, where n is equal to the number of columns in the processing engine array 210. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory banks 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the memory subsystem 204, along with input data 250 on which the neural network will operate. The neural network can also include instructions, which can program the processing engine array 210 to perform various computations on the weights and the input data. The instructions can also be stored in the memory subsystem 204, in the memory banks 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the memory subsystem 204 for inputting into the processing engine array 210 to compute results for the next layer of the neural network. The processing engine array 210 can further output final results from a last layer of the neural network. The final results can be stored in the memory subsystem 204 and then be copied out to host processor memory or to another location.

Figure 3:
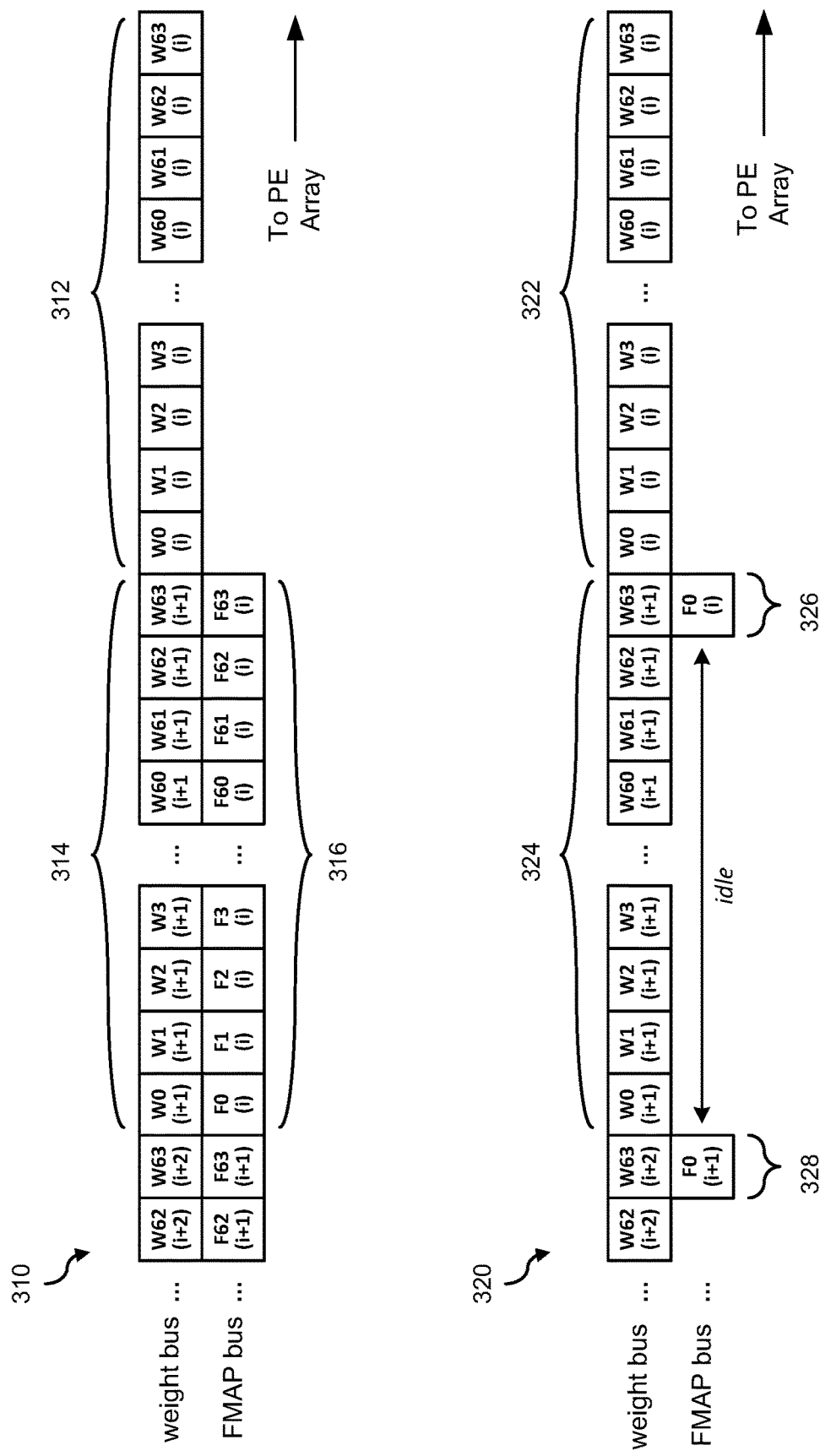
FIG. 3 shows example timing diagrams for loading an array using two dedicated row input buses.

FIG. 3 illustrates example timing diagrams of loading data elements into a row of an array using a dedicated weight input bus and a dedicated FMAP input bus for the corresponding row. In the examples shown in FIG. 3, the row-size of the array has 64 processing elements. Timing diagram 310 shows the timing for loading 64 weight values and 64 FMAP input elements into a row of the array for performing matrix multiplication operations with a FMAP dimensionality of 64 elements per row. As described above, the weight values for a particular matrix multiplication operation is loaded into the array first, followed by the FMAP input elements. Thus, as shown in timing diagram 310, the set of weight values 312 including W0(i) to W63(i) for the initial matrix multiplication operation (i) is loaded into the row on the dedicated weight bus during the first 64 cycles. In the next 64 cycles, the set of FMAP input elements 316 including F0(i) to F63(i) for the initial matrix multiplication operation (i) is loaded into the row on the dedicated FMAP bus. At the same time while the set of FMAP input elements 316 are being loaded into the row of the array, the next set of weight values 314 including W0(i+1) to W63(i+1) for the next matrix multiplication operation (i+1) can be loaded into the row on the dedicated weight bus. Under this scenario, the input buses are fully saturated after the initial weight load, and the array is operating at full efficiency.

Timing diagram 320 shows the timing for loading 64 weight values and 1 FMAP input element into a row of the array for performing matrix multiplication operations with a FMAP dimensionality of 1 element per row (e.g., a MLP having a batch size of 1). The set of weight values 322 including W0(i) to W63(i) for the initial matrix multiplication operation (i) is loaded into the row on the dedicated weight bus during the first 64 cycles. In the next cycle, the F0(i) FMAP input element 326 for the initial matrix multiplication operation (i) is loaded into the row on the dedicated FMAP bus. At the same time, the next set of weight values 324 including W0(i+1) to W63(i+1) for the next matrix multiplication operation (i+1) can begin loading into the row on the dedicated weight bus. However, as shown in timing diagram 320, the FMAP bus will remain idle for 63 cycles while the weight values W0(i+1) to W62(i+1) are being loaded into the row. Even though the FMAP bus is available during this time, the F0(i+1) FMAP input element 328 for matrix multiplication operation (i+1) may not be loaded into the array, because the set of weight values 324 for the same matrix multiplication operation (i+1) has not finish loading yet. As a result, execution of the matrix multiplication operation (i+1) has to wait until loading of the set of weight values 324 completes. This may lead to a potential inefficiency of 1/64 in the array when executing matrix multiplications having such a small FMAP dimensionality of 1 element per row.

Figure 4:
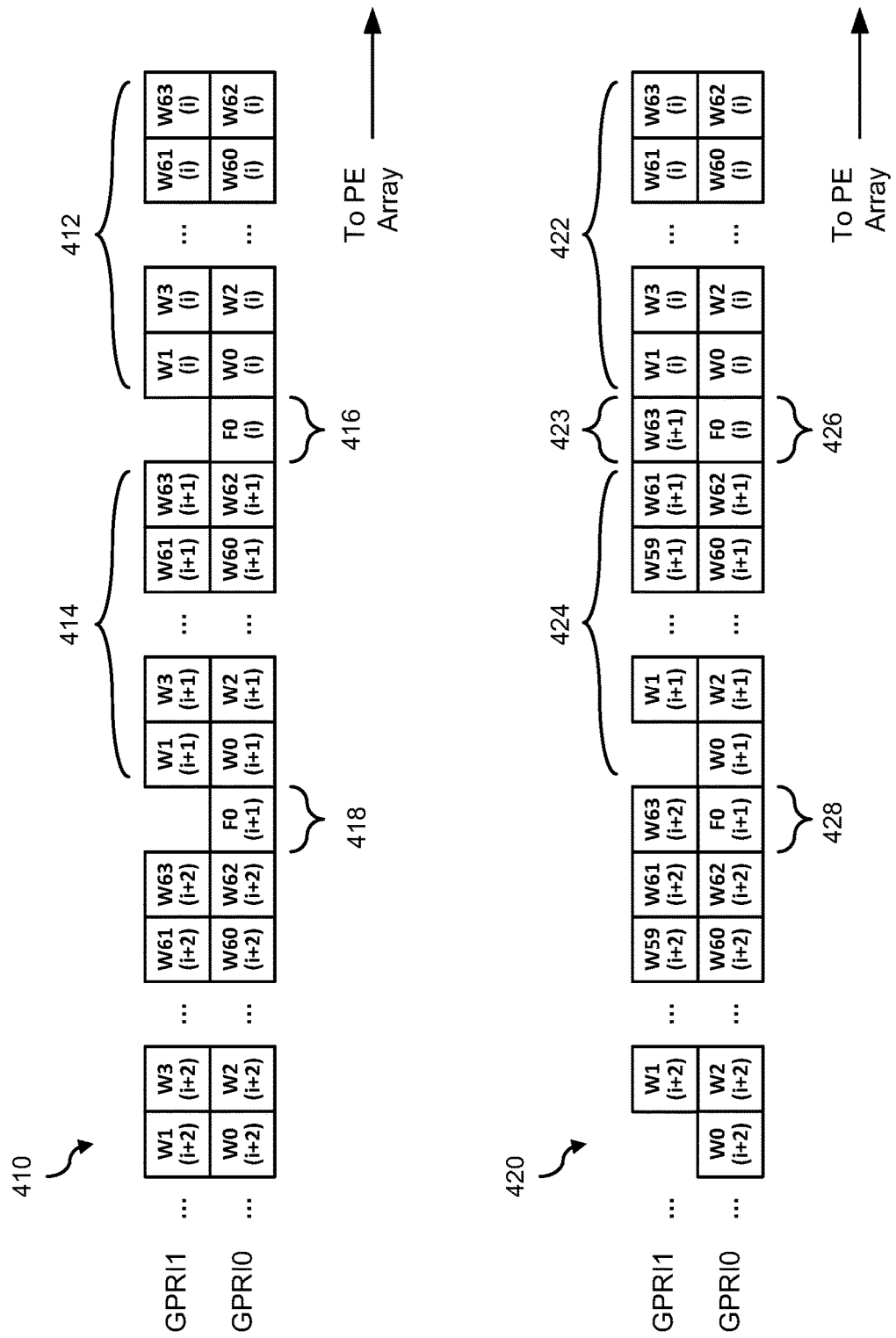
FIG. 4 shows example timing diagrams for loading an array using two general purpose row input data buses.

FIG. 4 illustrates example timing diagrams of loading data elements into a row of an array having a row-size of 64 processing elements using general purpose row input data buses instead of dedicated weight and FMAP buses. Timing diagram 410 shows the timing of one implementation for loading 64 weight values and 1 FMAP input element into the row of the array for performing matrix multiplication operations with a FMAP dimensionality of 1 element per row. The set of weight values 412 including W0(i) to W63(i) for the initial matrix multiplication operation (i) is loaded into the row in parallel on the two general purpose row input data buses GPRI0 and GPRI1. In the next cycle, the F0(i) FMAP input element 416 for the initial matrix multiplication operation (i) is loaded into the row on one of the row input data bus (e.g., GPRI0 bus). Following the loading of F0(i) FMAP input element 416, the next set of weight values 414 including W0(i+1) to W63(i+1) for the next matrix multiplication operation (i+1) are loaded into the row in parallel on the two general purpose row input data buses GPRI0 and GPRI1. As compared to timing diagram 320, by using the two general purpose row input data buses GPRI0 and GPRI1 to load the set of weight values 414 in parallel, the background weight loading for matrix multiplication operation (i+1) can be completed in half the time or just 32 cycles. Immediately after the set of weight values 414 has transferred to the row of the array, the F0(i+1) FMAP input element 418 for the matrix multiplication operation (i+1) can be loaded into the row of the array. As a result, execution of the matrix multiplication operation (i+1) can start 32 cycles sooner as compared to using the dedicated input buses of timing diagram 320.

Timing diagram 420 shows the timing of another implementation for loading 64 weight values and 1 FMAP input element into the row of the array for performing matrix multiplication operations with a FMAP dimensionality of 1 element per row. The difference between timing diagram 420 and timing diagram 410 is that the background weight loading begins in parallel with loading of the FMAP input element. For example, the W63(i+1) weight value 423 for the matrix multiplication operation (i+1) is loaded in parallel with the F0(i) FMAP input element 426 for the initial matrix multiplication operation (i). Although the reduction in background weight loading times are similar in both timing diagrams 410 and 420, the advantages of initiating the background weight loading in parallel with FMAP loading will become apparent for larger FMAP dimensions as discussed below.

Figure 5:
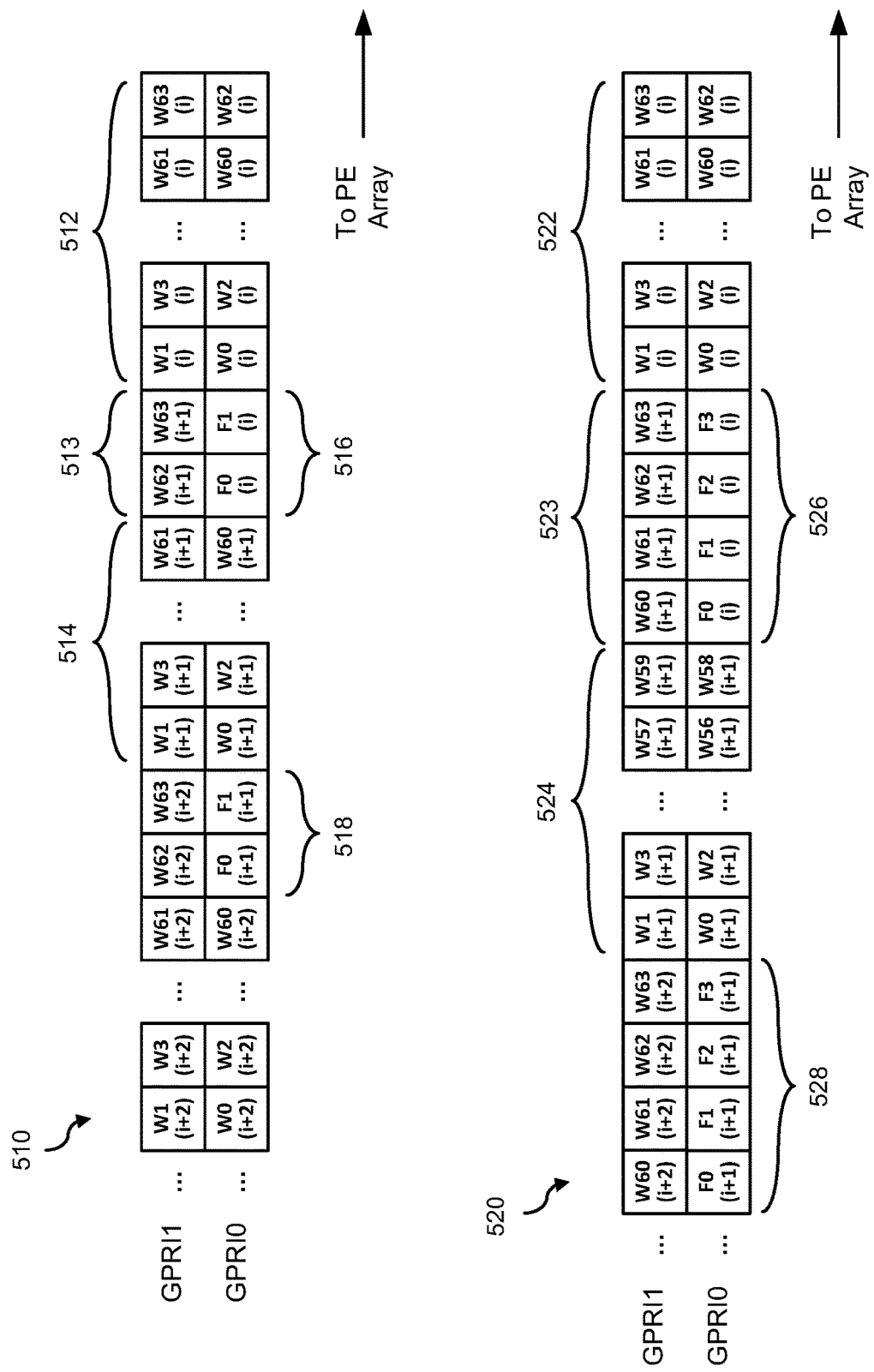
FIG. 5 shows further example timing diagrams for loading an array using two general purpose row input data buses.

FIG. 5 illustrates further example timing diagrams of loading data elements into a row of an array having a row-size of 64 processing elements using general purpose row input data buses instead of dedicated weight and FMAP buses. Timing diagram 510 shows the timing for loading 64 weight values and 2 FMAP input element into the row of the array for performing matrix multiplication operations with a FMAP dimensionality of 2 elements per row. The set of weight values 512 including W0(i) to W63(i) for the initial matrix multiplication operation (i) is loaded into the row in parallel on the two general purpose row input data buses GPRI0 and GPRI1. In the next two cycles, the set of FMAP input elements 516 including F0(i) and F1 (i) for the initial matrix multiplication operation (i) is loaded into the row on one of the row input data bus (e.g., GPRI0 bus). At the same time while the set of FMAP input elements 516 are being loaded, the set of weight values 513 including W62(i+1) and W63(i+1) for the next matrix multiplication operation (i+1) can be loaded in parallel with the set of FMAP input elements 516. Following these two cycles, the remaining set of weight values W0(i+1) to W61 (i+1) for matrix multiplication operation (i+1) can be loaded in parallel on the two general purpose row input data buses GPRI0 and GPRI1. As shown in timing diagram 510, the two general purpose row input data buses GPRI0 and GPRI1 are fully saturated, and full utilization of the array can be achieved.

Timing diagram 520 shows the timing for loading 64 weight values and 4 FMAP input element into the row of the array for performing matrix multiplication operations with a FMAP dimensionality of 4 elements per row. The set of weight values 522 including W0(i) to W63(i) for the initial matrix multiplication operation (i) is loaded into the row in parallel on the two general purpose row input data buses GPRI0 and GPRI1. During the next four cycles, the set of FMAP input elements 526 including F0(i) to F3 (i) for the initial matrix multiplication operation (i) is loaded into the row on one of the row input data bus (e.g., GPRI0 bus). At the same time while the set of FMAP input elements 526 are being loaded, the set of weight values 523 including W60 (i+1) to W63(i+1) for the next matrix multiplication operation (i+1) can be loaded in parallel with the set of FMAP input elements 526. Following these four cycles, the remaining set of weight values W0(i+1) to W59 (i+1) for matrix multiplication operation (i+1) can be loaded in parallel on the two general purpose row input data buses GPRI0 and GPRI1. Similar to timing diagram 510, the two general purpose row input data buses GPRI0 and GPRI1 in timing diagram 520 are fully saturated, and full utilization of the array can be achieved.

Thus far, the improved utilization of using general purpose row input data buses have been shown with implementations having two general purpose row input data buses. The improvement in background weight loading times in such implementations can be achieved without introducing any additional buses as compared to using dedicated weight and FMAP buses. In other implementations, further reduction in background weight loading times can be achieved by providing additional general purpose row input data buses. For example, some implementations can have at least four, five, nine, or more general purpose row input data buses per row in an array.

Figure 6:
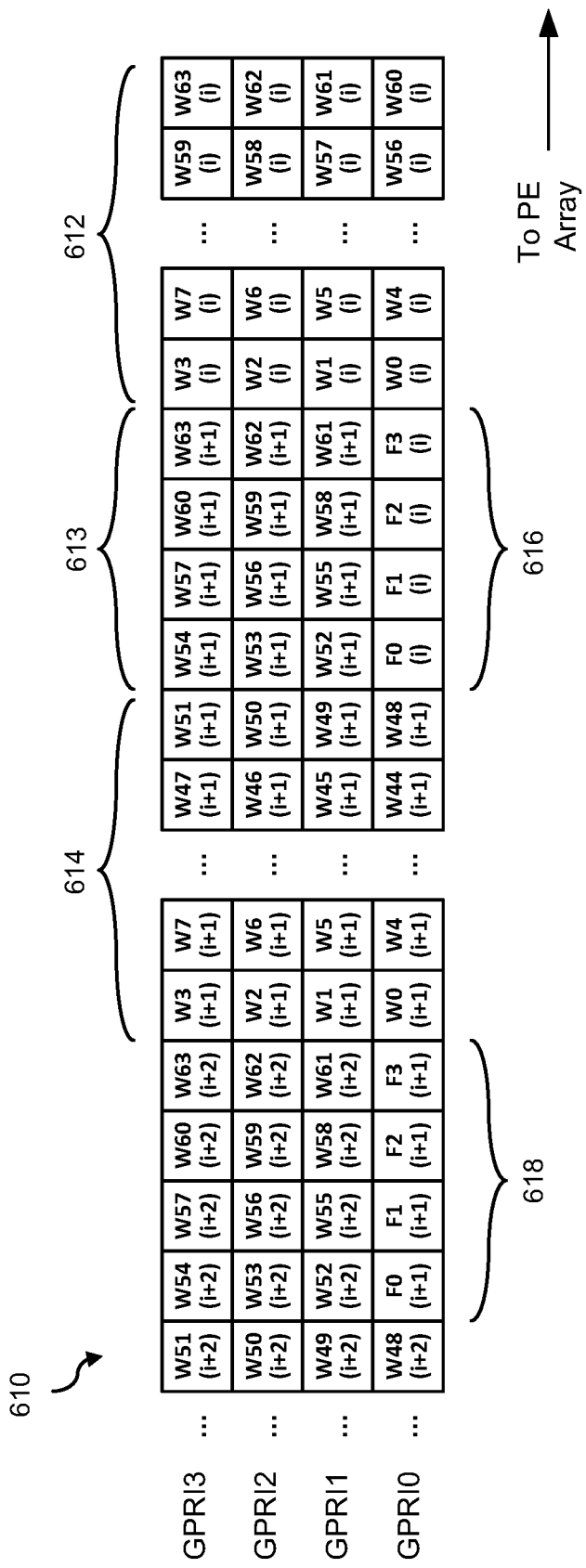
FIG. 6 shows another example timing diagram for loading an array using four general purpose row input data buses.

FIG. 6 illustrates an example timing diagram of loading data elements into a row of an array having a row-size of 64 processing elements using four general purpose row input data buses. Timing diagram 610 shows the timing for loading 64 weight values and 4 FMAP input element into the row of the array for performing matrix multiplication operations with a FMAP dimensionality of 4 elements per row. The set of weight values 612 including W0(i) to W63(i) for the initial matrix multiplication operation (i) is loaded into the row in parallel on the four general purpose row input data buses GPRI0 to GPRI3. In the next four cycles, the set of FMAP input elements 616 including F0(i) to F3 (i) for the initial matrix multiplication operation (i) is loaded into the row on one of the row input data bus (e.g., GPRI0 bus). At the same time while the set of FMAP input elements 616 are being loaded, the set of weight values 613 including W52 (i+1) to W63(i+1) for the next matrix multiplication operation (i+1) can be loaded on the remaining row input data buses GPRI1 to GPRI3 in parallel with the set of FMAP input elements 516. Following these four cycles, the remaining set of weight values W0(i+1) to W51 (i+1) for matrix multiplication operation (i+1) can be loaded in parallel on the four general purpose row input data buses GPRI0 to GPRI3. As compared to timing diagram 520 having the same FMAP dimensionality of 4 FMAP elements per row, the background weight loading time of W0(i+1) to W63 (1+1) for matrix multiplication operation (i+1) can be further reduced from 34 cycles to 17 cycles by utilizing two addition general purpose row input data buses.

Figure 7:
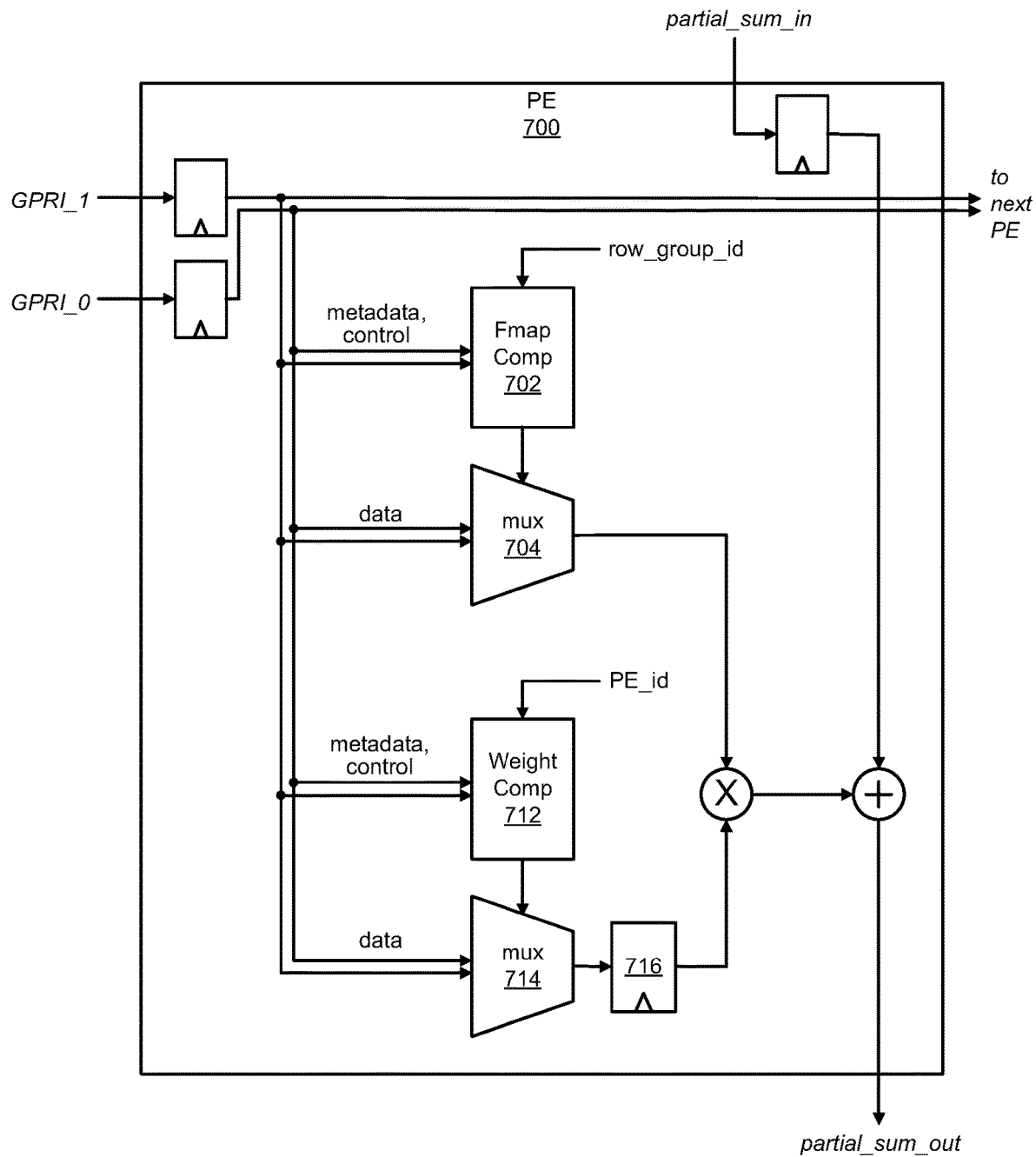
FIG. 7 is a block diagram illustrating an example of a processing element.

FIG. 7 illustrates a block diagram of an example of a processing element 700 that can support multiple general purpose row input buses, according to some implementations. PE 700 may have a PE identifier (e.g., PE number) that is used to identify PE 700 in the corresponding row. The PE identifier can be stored in a programmable register such that the PE identifier can be configurable. In some implementations, PE 400 may also include a programmable row group identifier that is used to indicate which row group in the corresponding row that PE 400 belongs to, for example, when concurrent independent matrix multiplications are being performed in the array. In some implementations, a subset of bits (e.g., most significant bits) of the PE identifier can be used as the row group identifier. In other implementations in which the array is not expected to perform concurrent independent matrix multiplications, the row group identifier can be omitted. Although PE 700 shown in FIG. 7 has two general purpose row input data buses GPRI0 and GPRI1, it should be understood that in other implementations, PE 700 can have more general purpose row input data buses (e.g., four, five, nine, or more general purpose row input data buses, etc.).

One or more of the row input data buses can be operable to switch between transferring FMAP input elements and transferring weight values to the corresponding row. Each row input data bus can be used to shift data elements across the columns of an individual row. Each data element may be shifted across one PE (or one column) per clock cycle in the corresponding row. The width of each row input data bus may depend on the number of bits of the data element being transferred, and the number of bits of metadata and/or control information.

For example, if the array supports computations on 16-bit floating point numbers, each row input data bus may include 16 bits to transfer either a 16-bit floating point FMAP input element or a 16-bit floating point weight value. In addition, each row input data bus may include at least one control bit to provide data type information indicating whether the data element being transferred is an FMAP input element or a weight value. Furthermore, each row input data bus may further include a set of metadata bits to indicate which PE in the row that the data element is intended for. When a PE receives the input data during a clock cycle, if the asserted metadata bit(s) corresponds to the PE or row group identifier of the PE, the PE may store the data element (e.g., cache a weight value) or perform a computation using the received data element (e.g., multiply the received FMAP with a previously stored weight value). If the asserted metadata bit(s) does not correspond to the PE or row group identifier, the PE may simply pass through the input data to the PE in the next column on the next clock cycle without using the data element for any computations. In some implementations, the metadata and/or control information can be stored together with the data in memory (e.g., memory subsystem 204), or can be inserted into the datapath by a sequencer that reads the data elements from memory and inputs the data into the array.

PE 700 may include a FMAP comparator 702 to compare the control bit(s) received on each row input data bus to determine if the data type information indicates the row input data bus is transferring a FMAP input element. If the data type information indicates that a row input data bus is transferring a FMAP input element, FMAP comparator 702 may compare the metadata received on that row input data bus with the row group identifier to determine if the FMAP input element is intended for PE 700. If both the data type information indicates that the particular row input data bus is transferring a FMAP input element, and the metadata corresponds to the row group identifier of PE 700, then FMAP comparator 702 may output a selection signal to multiplexor 704 to select the data on this particular row input data bus as the FMAP input element for the multiplier. In implementations that omit the row group identifier, FMAP comparator 702 may only need to compare the data type information to determine if the row input data bus is transferring a FMAP input element and output the selection signal to multiplexor 704 to select the data on this particular row input data bus as the FMAP input element for the multiplier.

PE 700 may also include a weight comparator 712 to compare the control bit(s) received on each row input data bus to determine if the data type information indicates the row input data bus is transferring a weight value. If the data type information indicates that a row input data bus is transferring a weight value, weight comparator 712 may compare the metadata received on that row input data bus with the PE identifier to determine if the weight value is intended for PE 700. If both the data type information indicates that the particular row input data bus is transferring a weight value, and the metadata corresponds to the PE identifier of PE 700, then weight comparator 712 may output a selection signal to multiplexor 714 to select the data on this particular row input data bus as the weight value to store in weight register 716 for the next computation.

Figure 8:
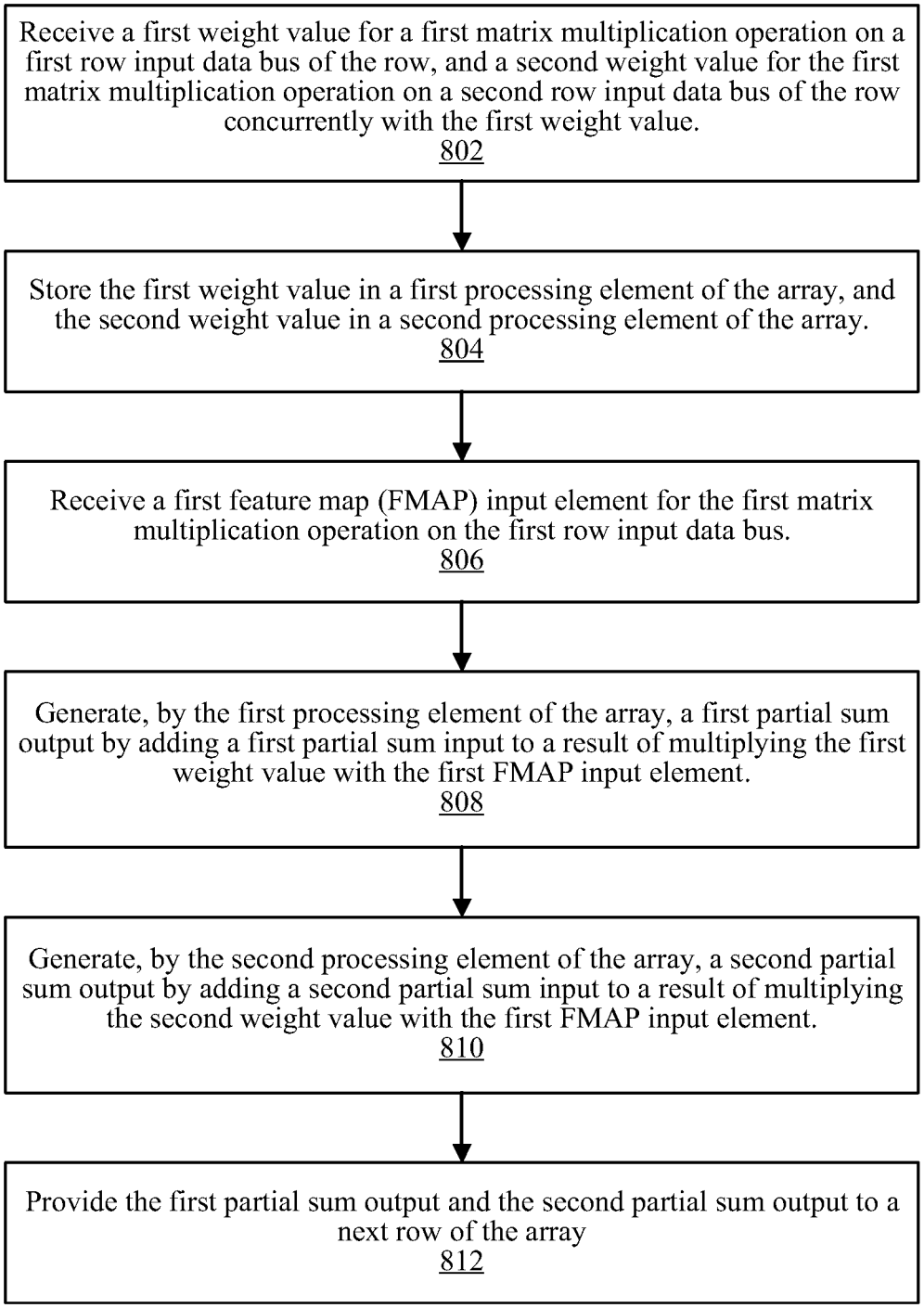
FIG. 8 illustrates an example of a flow diagram of a process to perform a matrix multiplication operation.

FIG. 8 illustrates a flowchart of an example of a process 800 for perform matrix multiplication operations using an array of processing elements, according to some implementations. The array of processing elements is arranged in rows and columns, and each row of the array may have a set of row input data buses including a first row input data bus and a second row input data bus. The array is coupled to a memory operable to store data elements include weight values and feature map (FMAP) input elements for loading into the array. Each data element can be transferred to the array together with data type information indicating whether the data element is a weight value or a FMAP input element, and each weight value can be transferred to the array together with a processing element identifier that identifies which processing element in the row that the weight value is intended for The processing elements in the array can be operable to multiply a FMAP input element with a weight value to generate a multiplication result, add the multiplication result to a column input to generate a partial sum, and output the partial sum to a column output. For example, each processing element (PE) may include a multiplier circuit operable to multiply the FMAP input element with a weight value, and an adder circuit operable to add an output of the multiplier to the partial sum input to generate the partial sum output. Each PE may also include a weight register operable to store a weight value for the next matrix multiplication operation while the PE is performing the current computation, and a weight multiplexor operable to select between the data elements transferred on the set of row input data buses to store in the weight register. Each PE may also include a FMAP multiplexor operable to select between the data elements transferred on the set of row input data buses to use as the FMAP input element for the multiplier. Each PE may further include a programmable register operable to store a processing element identifier that is used to identify the PE in the corresponding row.

Referring to FIG. 8, process 800 may begin at block 802 by receiving a first weight value for a first matrix multiplication operation on a first row input data bus of the row, and a second weight value for the first matrix multiplication operation on a second row input data bus of the row concurrently with the first weight value. In other words, the two weight values are being transferred to the row of the array in parallel during one cycle on the two row input data bus. In some implementations, each row may have additional row input data buses such as four row input data buses, and four weight values may be received in parallel on the four row input data buses. Each weight value can be received together with data type information indicating that a weight value is being transferred, and metadata indicating which PE that the corresponding weight value is intended for. The two weight values are shifted across the PEs in the row of the array one PE per cycle.

At block 804, when a first PE in the row of the array receiving the first weight value may store the first weight value in the weight register of the first PE in response to comparing the metadata of the first weight value with a processing element identifier of the first PE, and determining that the first weight value is intended for the first PE based on the comparison. Similarly, a second PE in the same row of the array receiving the second weight value may store the second weight value in the weight register of the second PE in response to comparing the metadata of the second weight value with a processing element identifier of the second PE, and determining that the second weight value is intended for the second PE based on the comparison.

At block 806, in a subsequent cycle, the row of the array may receive a FMAP input element for the first matrix multiplication operation on one of the row input data buses. Depending on the matrix multiplication dimensionality, one or more FMAP input elements can received on the same row input data bus. Each FMAP input element can be received together with data type information indicating that a FMAP input element is being transferred. In some implementations, while the FMAP input element is being received on one row input data bus, a third weight value for a second matrix multiplication operation can be received on the other row input data bus concurrently with the FMAP input element.

At block 808, when the FMAP input element propagates to the first PE, the first PE may generate a first partial sum output by adding a first partial sum input to a result of multiplying the first weight value with the first FMAP input element. Similarly, at block 810, when the FMAP input element propagates to the second PE in the same row, the second PE may generate a second partial sum output by adding a second partial sum input to a result of multiplying the second weight value with the second FMAP input element. At block 812, the first partial sum and the second partial sum can be outputted to the next row of the array. A similar process can be carried out on the other PEs and rows of the array to complete the computations for the matrix multiplication operation.

Figure 9:
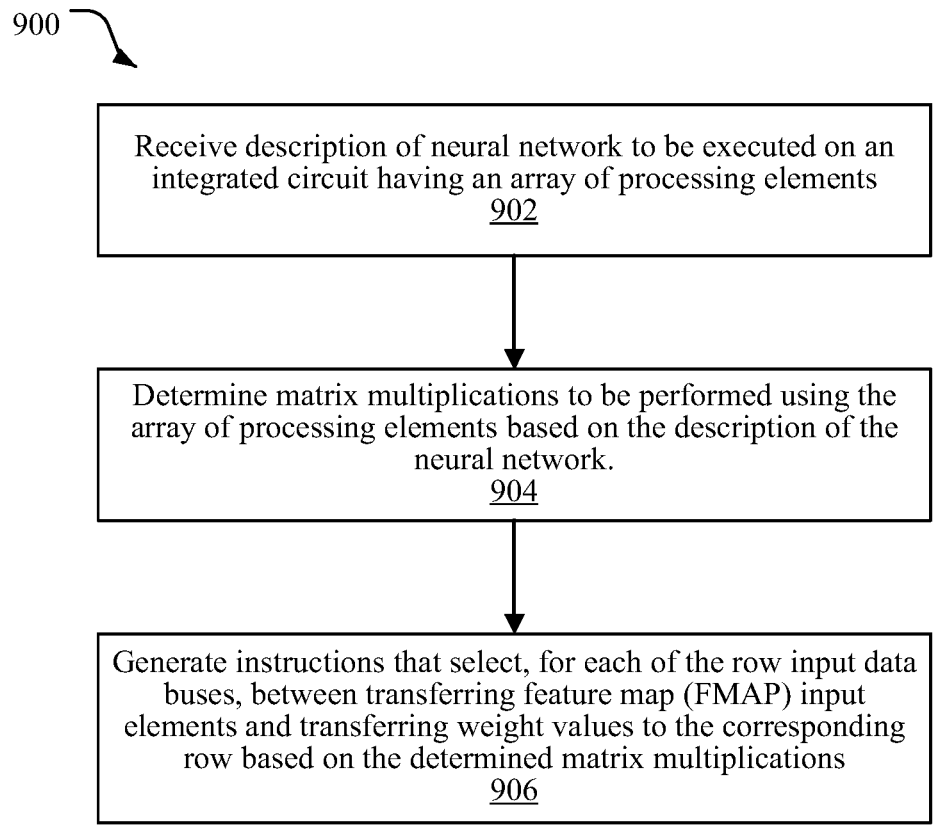
FIG. 9 illustrates an example of a flow diagram of a process to generate instructions for an array of processing elements.

FIG. 9 includes a flowchart illustrating an example of a process 900 for generating instructions for a processing engine array to perform matrix multiplications, according to some implementations. The steps in process 900 may be implemented by the systems described above, such as for example, compiler 130 of host system 100.

Process 900 may begin at block 902 by receiving a description of a neural network to be executed on an integrated circuit having an array of processing elements. The integrated circuit can be, for example, a neural network processor or neural network accelerator. The description of the neural network may include information indicating what types of computations are performed in the neural network, such as the size of matrices involved in matrix multiplication operations to implement the neural network.

At block 904, the matrix multiplications to be performed using the array of processing elements can be determined based on the description of the neural network. Depending on the particular application (e.g., text-to-speech or speech-to-text, language translation, or other low latency applications, etc.), the matrix multiplications may include matrix multiplications with small FMAP dimensionality. For example, with a multilayer perceptron model (MLP) or a recurrent neural network (RNN) having a batch size of 1, the FMAP can be a one element wide vector.

At block 906, instructions for the processing engine array can be generated to select between transferring feature map (FMAP) input elements and transferring weight values for each of the row input data buses of the corresponding row of the array based on the matrix multiplications determined in block 904. The generated instructions may indicate which data element (FMAP or weight value) stored in memory is inputted into which processing element/row of the array as execution of the neural network progresses. In some implementations, a sequencer that reads the data from memory and inputs the data into the array may use the instructions to generate and insert the metadata and control information that are transmitted together with the FMAP/weight values on the row input data buses. In some implementations, the metadata and control information can be stored together with the data elements in memory.

In some implementations, the instructions may cause an initial set of weight values for an initial matrix multiplication operation to be loaded into each row of the array in parallel across all row input data buses of the corresponding row. Following the initial set of weight values, the FMAP input elements for the initial matrix multiplication operation can be loaded into each row of the array using one of the row input data buses of the corresponding row, while weight values for the next matrix multiplication operation are loaded in parallel with the FMAP input elements using the remaining row input data buses of the corresponding row. If loading of the FMAP input elements completes before the weight values for the next matrix multiplication operation, any remaining weight values for the next matrix multiplication operation can be loaded into each row of the array in parallel across all row input data buses of the corresponding row.

As discussed above, by providing row input data buses that can switch between loading FMAP input elements and loading weight values, the data loading across the set of row input data buses can be manipulated to achieve full or near full bus and array utilization. Weight loading times can be sped up by transferring weight values in parallel. As a result, computations with small FMAP dimensionality can be initiated faster, and array idle times can be reduced.

Figure 10:
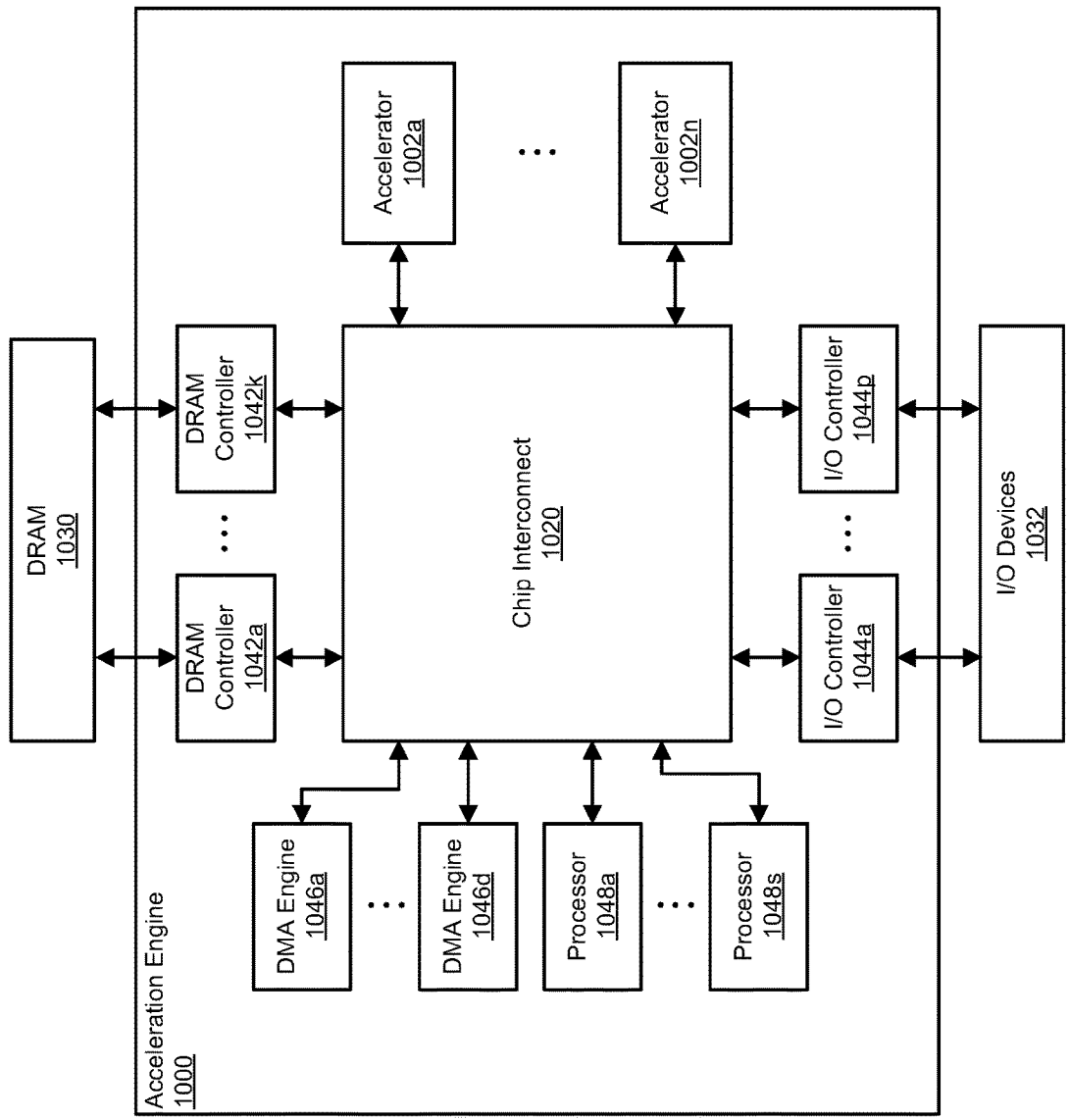
FIG. 10 includes a block diagram that illustrates an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. ##AA.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the accelerators is a graphics accelerator) or can be different (e.g., the accelerators 1002a-1002n include a graphics accelerator, a floating point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
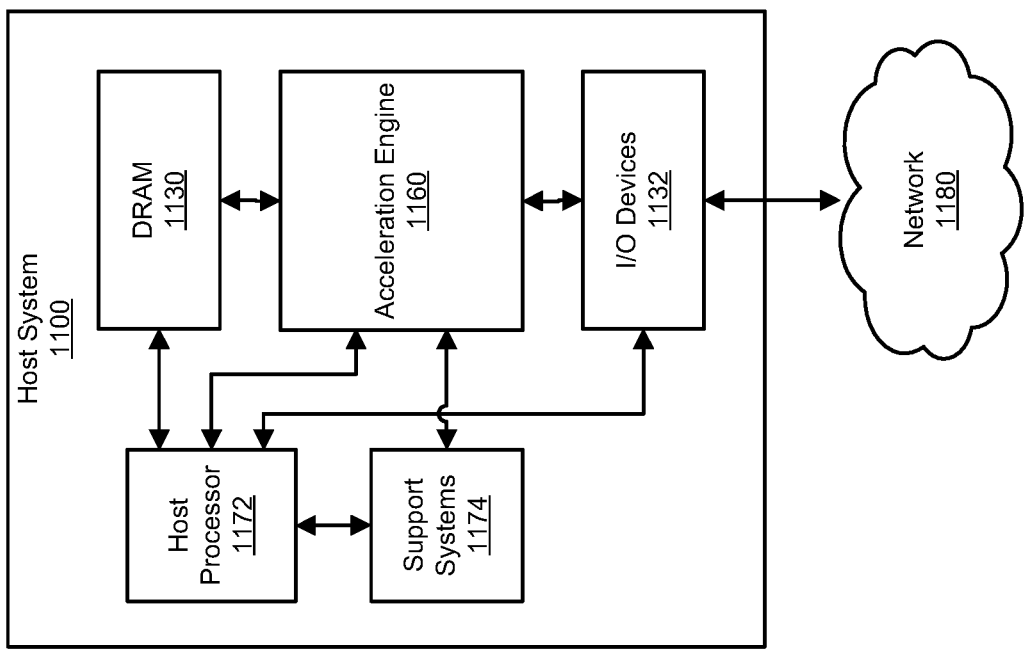
FIG. 11 includes a block diagram that illustrates an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail.

It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network processor comprising:

an array of processing elements arranged in rows and columns, wherein each row of the array includes a plurality of row input data buses, wherein each processing element (PE) is operable to multiply a feature map (FMAP) input element with a weight value to generate a multiplication result, add the multiplication result to a column input to generate a partial sum, and output the partial sum to a column output, and wherein each PE includes a first multiplexor operable to receive inputs from each of the plurality of row input data buses and select which of the inputs to use as the FMAP input element; and a memory operable to store weight values and FMAP input elements for loading into the array, wherein the plurality of row input data buses of a row is operable to transfer a first set of weight values for a first matrix multiplication operation from the memory into the row in parallel, and after transferring the first set of weight values, transfer a set of FMAP input elements for the first matrix multiplication operation from the memory on one of the row input data buses of the row with a second set of the weight values for a second matrix multiplication operation on another row input data bus of the row, and wherein the set of FMAP input elements for the first matrix multiplication operation and the second set of the weight values for the second matrix multiplication operation are transferred into the row concurrently.

2. The neural network processor of claim 1, wherein each PE includes a second multiplexor operable to receive the inputs from each of the plurality of row input data buses and selects which of the inputs to provide to a weight register.

3. The neural network processor of claim 1, wherein each weight value is transferred to the array together with data type information indicating that a weight value is being transferred, and a PE identifier that identifies which PE in the row the weight value is intended for.

4. The neural network processor of claim 1, wherein each row of the array includes four row input data buses.

5. An integrated circuit device comprising:
an array of processing elements arranged in rows and columns, wherein each row of the array includes a set of row input data buses including a first row input data bus and a second row input data bus to load data elements into the corresponding row, wherein each processing element (PE) in the array includes a multiplier and a multiplexor to select between the data elements transferred on the first row input data bus and the second row input data bus to provide to the multiplier, and each PE includes a first row output bus and a second row output bus to output the data elements provided to the multiplexor by the first row input data bus and the second row input data bus, respectively; and
a memory configured to store the data elements including weight values and feature map (FMAP) input elements,
wherein the set of row input data buses of a row is operable to:
transfer a first set of weight values for a first matrix multiplication operation including a first weight value on the first row input data bus in parallel with a second weight value on the second row input data bus, the first weight value intended for a PE belonging to a different column of the array than the second weight value; and
transfer a FMAP input element for the first matrix multiplication operation on the first row input data bus after the first set of weight values has been transferred.

6. The integrated circuit device of claim 5, wherein the set of row input data buses of the row is further operable to transfer a second set of weight values for a second matrix multiplication operation on the second row input data bus while the first row input data bus is transferring FMAP input elements for the first matrix multiplication operation.

7. The integrated circuit device of claim 6, wherein the set of row input data buses of the row is further operable to transfer a third set of weight values for the second matrix multiplication operation on the first and second row input data buses in parallel after the FMAP input elements for the first matrix multiplication operation has been transferred.

8. The integrated circuit device of claim 5, wherein the set of row input data buses of the row includes a third row input data bus and a fourth row input data bus, and wherein the set of row input data buses of the row is operable to transfer the first set of weight values for the first matrix multiplication operation on the first, second, third, and fourth row input data buses in parallel.

9. The integrated circuit device of claim 5, wherein the multiplier is operable to multiply an FMAP input element with a weight value, and wherein each PE includes an adder operable to add an output of the multiplier to a partial sum input.

10. The integrated circuit device of claim 5, wherein each PE further includes:
a weight register operable to store a weight value for a next matrix multiplication operation.

11. The integrated circuit device of claim 10, wherein the multiplexor is a weight multiplexor operable to select between the data elements transferred on the set of row input data buses to store in the weight register.

12. The integrated circuit device of claim 5, wherein the multiplexor is a FMAP multiplexor operable to select between the data elements transferred on the set of row input data buses to use as the FMAP input element for the multiplier.

13. The integrated circuit device of claim 5, wherein each data element is transferred to the array together with data type information indicating whether the data element is a weight value or a FMAP input element.

14. The integrated circuit device of claim 5, wherein each weight value is transferred to the array together with a PE identifier that identifies which PE in the row the weight value is intended for.

15. The integrated circuit device of claim 5, wherein each PE further includes a programmable register operable to store a PE identifier.

16. A non-transitory computer-readable medium storing code that, when executed by one or more processors of a computing system, causes the computing system to:
receive a description of a neural network to be executed on an integrated circuit having an array of processing elements (PEs), wherein each row of the array includes a plurality of row input data buses;
determine a plurality of matrix multiplications to be performed using the array of PEs based on the description of the neural network; and
generate instructions based on the plurality of matrix multiplications that switch, for a row of the array, between:
transferring weight values in parallel on the plurality of row input data buses to the row; and
transferring feature map (FMAP) input elements on one row input data bus of the plurality of row input data buses to the row concurrently with weight values being transferred on another row input data bus of the plurality of row input data buses to the row.

17. The non-transitory computer-readable medium of claim 16, wherein transferring the FMAP input elements includes transferring, with each FMAP input element, data type information indicating that a FMAP input element is being transferred instead of a weight value.

18. The non-transitory computer-readable medium of claim 16, wherein transferring the weight values includes transferring, with each weight value, data type information indicating that a weight value is being transferred instead of a FMAP input element.

19. The non-transitory computer-readable medium of claim 16, wherein transferring the weight values includes transferring, with each weight value, a PE identifier indicating which PE of the row the weight value is intended for.

20. The non-transitory computer-readable medium of claim 19, wherein the PE identifier of a PE is programmable.

* * * * *